United States Patent
Hayashi et al.

(10) Patent No.: US 11,826,615 B2
(45) Date of Patent: Nov. 28, 2023

(54) GOLF BALL RUBBER COMPOSITION AND GOLF BALL USING THE SAME

(71) Applicant: Sumitomo Rubber Industries, Ltd., Kobe (JP)

(72) Inventors: Kai Hayashi, Kobe (JP); Kazuyoshi Shiga, Kobe (JP); Hikaru Nagakura, Kobe (JP); Takahiro Shigemitsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/887,073

(22) Filed: May 29, 2020

(65) Prior Publication Data

US 2020/0376347 A1 Dec. 3, 2020

(30) Foreign Application Priority Data

May 31, 2019 (JP) ................................. 2019-102378
May 18, 2020 (JP) ................................. 2020-086932

(51) Int. Cl.
 A63B 37/06 (2006.01)
 A63B 37/00 (2006.01)
 C08L 9/00 (2006.01)

(52) U.S. Cl.
 CPC ............ A63B 37/0051 (2013.01); C08L 9/00 (2013.01); *A63B 37/0063* (2013.01); *A63B 37/0064* (2013.01)

(58) Field of Classification Search
 CPC ................................. C08L 9/00; A63B 37/0003
 USPC ........................................................ 473/351
 See application file for complete search history.

(56) References Cited

U.S. PATENT DOCUMENTS

| | | | |
|---|---|---|---|
| 10,729,938 B2* | 8/2020 | Sullivan | A63B 45/00 |
| 2009/0118038 A1 | 5/2009 | Shindo et al. | |
| 2009/0124412 A1 | 5/2009 | Shindo et al. | |
| 2009/0124758 A1 | 5/2009 | Shindo et al. | |
| 2014/0100059 A1 | 4/2014 | Kimura et al. | |
| 2015/0065268 A1* | 3/2015 | Nakajima | A63B 37/006 473/373 |

(Continued)

FOREIGN PATENT DOCUMENTS

| | | |
|---|---|---|
| JP | 63-212377 A | 9/1988 |
| JP | 2001-149504 A | 6/2001 |

(Continued)

*Primary Examiner* — Raeann Gorden
(74) *Attorney, Agent, or Firm* — Birch, Stewart, Kolasch & Birch, LLP

(57) ABSTRACT

An object of the present invention is to provide a cured product of a golf ball rubber composition imparting excellent durability. The present invention provides a cured product of a golf ball rubber composition cured from a golf ball rubber composition containing (a) a base rubber, (b) an α,β-unsaturated carboxylic acid having 3 to 8 carbon atoms and/or a metal salt thereof as a co-crosslinking agent, and (c) a crosslinking initiator, wherein the cured product of the golf ball rubber composition satisfies the following mathematical formula (1):

$$Y < (0.1 \times X) - 1.30 \qquad (1)$$

in the formula (1), Y represents an effective crosslinking density of the cured product of the rubber composition (mmol/cc), and X represents an amount of the component (b) with respect to 100 parts by mass of (a) the base rubber (parts by mass).

20 Claims, 1 Drawing Sheet

(56) References Cited

U.S. PATENT DOCUMENTS

2019/0329100 A1\* 10/2019 Cesareo ............. A63B 37/0076
2020/0001143 A1\* 1/2020 Shindo ..................... C08K 5/13

FOREIGN PATENT DOCUMENTS

| JP | 2004-121815 A | 4/2004 |
| JP | 2009-112806 A | 5/2009 |
| JP | 2009-119253 A | 6/2009 |
| JP | JF2009-119254 A | 6/2009 |
| JP | 2015-47502 A | 3/2015 |
| JP | 2015-77405 A | 4/2015 |

\* cited by examiner

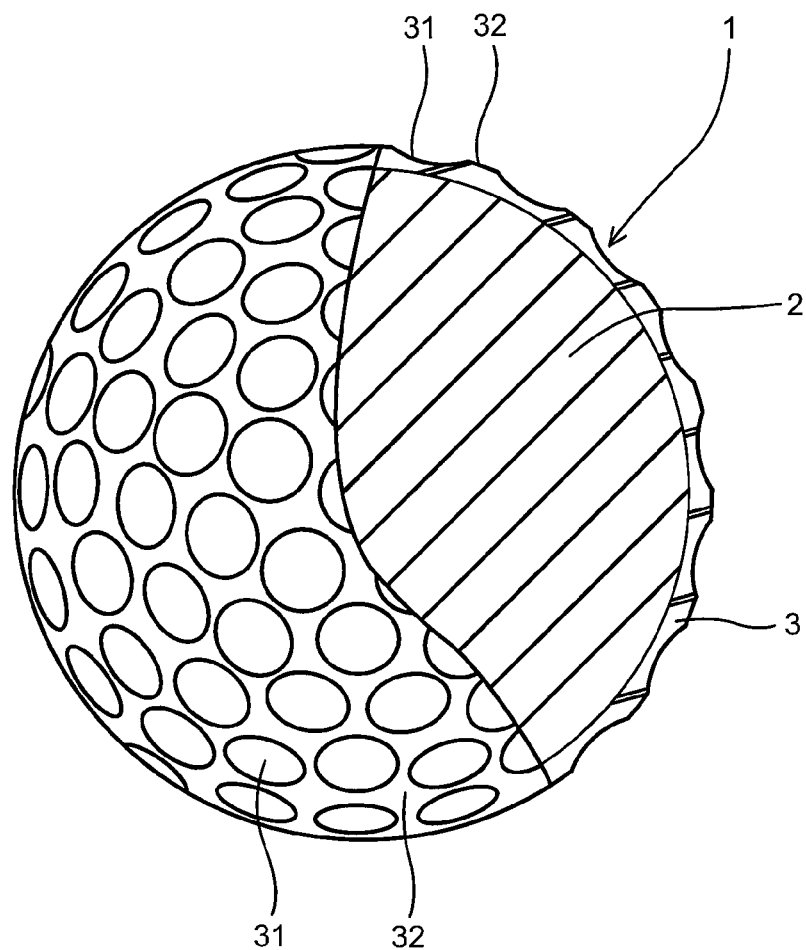

GOLF BALL RUBBER COMPOSITION AND GOLF BALL USING THE SAME

FIELD OF THE INVENTION

The present invention relates to a golf ball rubber composition, more specifically relates to a technology for improving a core rubber composition of a golf ball.

DESCRIPTION OF THE RELATED ART

As a material for forming a core of a golf ball, a rubber composition containing a base rubber, a co-crosslinking agent and a crosslinking initiator is widely used in light of its good resilience.

For example, JP 2015-077405 A discloses a golf ball comprising a core and a cover composed of at least one layer, wherein the core has a cross-sectional hardness which, letting R (mm) be a radius of the core, A be a JIS-C hardness at a center of the core, B be a JIS-C hardness at a position R/3 mm from the core center, C be a JIS-C hardness at a position R/1.8 mm from the core center, D be a JIS-C hardness at a position R/1.3 mm from the core center, and E be a JIS-C hardness at a surface of the core, satisfies formulas (1) to (4) below:

$$D-C \geq 7 \tag{1}$$

$$C-B \leq 7 \tag{2}$$

$$(D-C)-(C-B) \geq 7, \text{ and} \tag{3}$$

$$E-A \geq 16. \tag{4}$$

In addition, JP 2015-47502 A discloses a golf ball comprising a core and a cover of one layer or a plurality of layers, wherein the core is formed of a material molded under heat from a rubber composition comprising the following components (A) to (C):

(A) a base rubber,
(B) an organic peroxide, and
(C) water and/or a metal monocarboxylate;
and the product P×E of the difference P (mol/m$^3$) in crosslink density between a surface of the core and a center of the core, as measured based on a toluene swelling test, multiplied by the deflection E (mm) of the core when compressed under a final load of 1,275 N (130 kgf) from an initial load state of 98 N (10 kgf) is at least 28×10$^2$ mol/m$^3$·mm.

JP 2001-149504 A discloses a one-piece golf ball composed of a ball body and a clear coat applied on a surface of the ball body, wherein the ball body is formed from a white rubber composition containing a base rubber, an α,β-unsaturated carboxylic acid and/or a metal salt thereof, and an organic peroxide, the white rubber composition is a rubber composition containing an antioxidant in an amount of from 0.1 to 5.0 parts by mass and a light stabilizer in an amount of from 0.05 to 3.0 parts by mass with respect to 100 parts by mass of the base rubber, and the clear coat contains an ultraviolet light absorbent in an amount of 0.05 to 5.0 parts by mass with respect to 100 parts by mass of a resin component.

JP 2004-121815 A discloses a golf ball comprising, as a constituent element, a heat-molded product of a rubber composition containing a polybutadiene having a cis-1,4 bond in a proportion of 60 weight % or more and a Mooney viscosity (M$_{1+4}$ (100° C.)) of 40 or more, an unsaturated carboxylic acid and/or a metal salt thereof, an organic peroxide, and a monophenol-based antioxidant.

JP S63-212377 A discloses a solid golf ball comprising an elastic portion as at least a part thereof, wherein the elastic portion is formed from a rubber composition containing a base rubber, an α,β-ethylenically unsaturated carboxylic acid metal salt, an ethylenically unsaturated carboxylic acid ester having a hindered phenol group, and a peroxide.

JP 2009-119253 A discloses a golf ball comprising, as a constituent element, a heat-molded product of a rubber composition containing the following components (A) to (E) as essential components:

1 to 50 mass % of (A) a modified polybutadiene having a vinyl content of 0 to 2% and a cis-1,4 bond content of 80% or more, and having an active terminal modified with at least one alkoxysilane compound, in a total amount of rubber components, 50 mass % or more of (B) a polybutadiene synthesized using a rare earth element-based catalyst having a stress relaxation time (T80) of less than 4.0, in the total amount of the rubber components, and 10 to 50 parts by mass of (C) an unsaturated carboxylic acid and/or a metal salt thereof, 5 to 80 parts by mass of (D) an inorganic filler, and 0.1 to 10 parts by mass of (E) an organic peroxide, with respect to 100 parts by mass of a total amount of the component (A) and the component (B).

JP 2009-119254 A discloses a golf ball comprising, as a constituent element, a heat-molded product of a rubber composition containing the following components (A) to (E) as essential components:

1 to 30 mass % of (A) a modified polybutadiene having a vinyl content of 0 to 2% and a cis-1,4 bond content of 80% or more, having an active terminal modified with at least one alkoxysilane compound, and having a Mooney viscosity of 40 or more, in a total amount of rubber components, 70 mass % or more of (B) a diene-based rubber having a Mooney viscosity of less than 50 other than the rubber component (A), in the total amount of the rubber components, and 10 to 50 parts by mass of (C) an unsaturated carboxylic acid and/or a metal salt thereof, 5 to 80 parts by mass of (D) an inorganic filler, and 0.1 to 10 parts by mass of (E) an organic peroxide, with respect to 100 parts by mass of a total amount of the component (A) and the component (B).

JP 2009-112806 A discloses a golf ball comprising, as a constituent element, a heat-molded product of a rubber composition containing the following components (A) to (E) as essential components:

1 mass % or more and less than 30 mass % of (A) a modified polybutadiene having a vinyl content of 0 to 2% and a cis-1,4 bond content of 80% or more, having an active terminal modified with at least one alkoxysilane compound, and having a Mooney viscosity of less than 40, 70 mass % or more of (B) a diene-based rubber other than the rubber component (A), and 10 to 50 parts by mass of (C) an unsaturated carboxylic acid and/or a metal salt thereof, 5 to 80 parts by mass of (D) an inorganic filler, and 0.1 to 10 parts by mass of (E) an organic peroxide, with respect to 100 parts by mass of a total amount of the component (A) and the component (B).

SUMMARY OF THE INVENTION

An object of the present invention is to provide a golf ball rubber composition imparting excellent durability to a golf ball. The present invention also provides a golf ball having excellent durability.

The present invention provides a cured product of a golf ball rubber composition containing (a) a base rubber, (b) an α,β-unsaturated carboxylic acid having 3 to 8 carbon atoms and/or a metal salt thereof as a co-crosslinking agent, and (c) a crosslinking initiator, wherein the cured product satisfies the following mathematical formula (1):

$$Y<(0.1\times X)-1.30 \quad (1)$$

in the formula (1), Y represents an effective crosslinking density of the cured product of the rubber composition (mmol/cc), and X represents an amount (parts by mass) of the component (b) with respect to 100 parts by mass of (a) the base rubber.

According to the present invention, a golf ball rubber composition imparting excellent durability is provided. According to the present invention, a golf ball having excellent durability is provided.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a cured product of a golf ball rubber composition containing (a) a base rubber, (b) an α,β-unsaturated carboxylic acid having 3 to 8 carbon atoms and/or a metal salt thereof as a co-crosslinking agent, and (c) a crosslinking initiator, wherein the cured product of the golf ball rubber composition satisfies the following mathematical formula (1):

$$Y<(0.1\times X)-1.30 \quad (1)$$

in the formula (1), Y represents an effective crosslinking density of the cured product of the rubber composition (mmol/cc), and X represents an amount (parts by mass) of the component (b) with respect to 100 parts by mass of (a) the base rubber.

The golf ball rubber composition according to the present invention satisfies the following mathematical formula (1), more preferably satisfies the following mathematical formula (2), even more preferably satisfies the following mathematical formula (3). If the mathematical formula (1) is satisfied, the obtained golf ball rubber composition has excellent durability.

$$Y<(0.1\times X)-1.30 \quad (1)$$

$$Y<(0.1\times X)-1.50 \quad (2)$$

$$Y<(0.1\times X)-2.00 \quad (3)$$

In the mathematical formulae (1), (2) and (3), Y represents an effective crosslinking density of the cured product of the rubber composition (mmol/cc), and X represents an amount (parts by mass) of the component (b) with respect to 100 parts by mass of (a) the base rubber.

The cured product of the rubber composition for measuring the effective crosslinking density is preferably in a state that vulcanization is nearly completed (a state that the crosslinking density becomes maximum). Specifically, the cured product of the rubber composition for measuring the effective crosslinking density is preferably a cured product of the rubber composition vulcanized at a temperature in a range from one-minute half-life temperature −10° C. to one-minute half-life temperature +10° C. of the crosslinking initiator for 30 minutes or more.

There is a case that particle surface of (b) the α,β-unsaturated carboxylic acid having 3 to 8 carbon atoms and/or the metal salt thereof used as the co-crosslinking agent is treated with stearic acid or zinc stearate. In such case, the amount excluding the amount of the treating agent such as stearic acid or zinc stearate is adopted as the amount X of the component (b).

The slab hardness of the cured product of the golf ball rubber composition according to the present invention is preferably 50 or more, more preferably 60 or more, and even more preferably 65 or more, and is preferably 95 or less, more preferably 90 or less, and even more preferably 85 or less in Shore C hardness.

Next, the materials contained in the golf ball rubber composition according to the present invention will be explained.

[(a) Base Rubber]

As (a) the base rubber, a natural rubber and/or a synthetic rubber can be used. For example, a polybutadiene rubber, a natural rubber, a polyisoprene rubber, a styrene polybutadiene rubber, or an ethylene-propylene-diene rubber (EPDM) can be used. These rubbers may be used solely, or at least two of these rubbers may be used in combination. Among them, typically preferred is a high cis-polybutadiene having a cis-1,4 bond in an amount of 40 mass % or more, preferably 80 mass % or more, more preferably 90 mass % or more, and even more preferably 95 mass % or more in view of its superior resilience.

From the viewpoint of obtaining a core having higher resilience, the amount of the high-cis polybutadiene in the base rubber is preferably 60 mass % or more, more preferably 80 mass % or more, and even more preferably 90 mass % or more. It is also preferable that (a) the base rubber consists of the high-cis polybutadiene.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 55 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

[(b) Co-Crosslinking Agent]

(b) The α,β-unsaturated carboxylic acid having 3 to 8 carbon atoms and/or the metal salt thereof used in the rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid and crotonic acid.

Examples of the metal ion constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ion such as tin and zirconium. The above metal component may be used solely or as a mixture of at least two of them. Among them, the divalent metal ion such as magnesium, calcium, zinc, barium and cadmium is preferably used as the metal component. This is because if the divalent metal salt of the α,β-unsaturated carboxylic acid having 3 to 8 carbon atoms is used, a metal crosslinking easily generates between the rubber molecules. Especially, as the divalent metal salt, zinc acrylate is preferable, because use of zinc acrylate enhances the resilience of the obtained golf ball. It is noted that the α,β-unsaturated carboxylic acid having 3 to 8 carbon atoms and/or the metal salt thereof may be used solely or as a mixture of at least two of them.

The amount of (b) the α,β-unsaturated carboxylic acid having 3 to 8 carbon atoms and/or the metal salt thereof is preferably 20 parts by mass or more, more preferably 25 parts by mass or more, and even more preferably 30 parts by mass or more, and is preferably 55 parts by mass or less, more preferably 50 parts by mass or less, and even more preferably 45 parts by mass or less, with respect to 100 parts by mass of (a) the base rubber. If the amount of (b) the α,β-unsaturated carboxylic acid having 3 to 8 carbon atoms and/or the metal salt thereof is less than 20 parts by mass, the amount of (c) the crosslinking initiator which will be described later must be increased such that the cured product (e.g. core) formed from the rubber composition has an appropriate hardness, which tends to lower the resilience of the obtained golf ball. On the other hand, if the amount of the α,β-unsaturated carboxylic acid having 3 to 8 carbon atoms and/or the metal salt thereof is more than 55 parts by mass, the cured product (e.g. core) formed from the rubber composition becomes so hard that the shot feeling of the obtained golf ball may be lowered.

[(c) Crosslinking Initiator]

(c) The crosslinking initiator used in the rubber composition is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. These organic peroxides may be used solely or as a mixture of at least two of them. Among them, dicumyl peroxide is preferably used.

In the case that the rubber composition contains either or both of the following component (d) and component (e), the amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the cured product (e.g. core) formed from the rubber composition is so soft that the resilience of the obtained golf ball tends to be lowered, and if the amount of the crosslinking initiator is more than 5.0 parts by mass, the amount of (b) the co-crosslinking agent described above must be decreased such that the cured product (e.g. core) formed from the rubber composition has an appropriate hardness, which tends to lower the resilience or worsen the durability of the obtained golf ball.

In the case that the rubber composition contain none of the following component (d) and component (e), the amount of (c) the crosslinking initiator is preferably 0.1 part by mass or less with respect to 100 parts by mass of the base rubber. If the amount of (c) the crosslinking initiator is 0.1 part by mass or less with respect to 100 parts by mass of the base rubber, the effective crosslinking density is decreased for the amount of the co-crosslinking agent, the breaking strain is increased, and the durability is enhanced.

The golf ball rubber composition according to the present invention preferably contains (d) a radical scavenger. Examples of (d) the radical scavenger include (d1) a hindered phenol-based compound and (d2) a hindered amine-based compound. If the golf ball rubber composition contains the component (d), the crosslinking density is lowered while keeping the hardness of the cured product.

[(d1) Hindered Phenol-Based Compound]

The hindered phenol-based compound is a compound having a hydroxyphenyl structure with a hydroxy group thereof being sterically protected by a bulky functional group. The bulky functional group preferably exists at a location adjacent to the hydroxy group. Examples of the bulky functional group include t-butyl group, and a long chain alkyl group optionally having a part of the carbon atoms thereof substituted with a sulfur atom. As the hindered phenol-based compound, a compound having a tert-butylhydroxyphenyl structure with at least one tert-butyl group is preferable, a compound having a di-tert-butylhydroxyphenyl structure with two tert-butyl groups is more preferable.

Examples of the compound having the tert-butylhydroxyphenyl structure with at least one tert-butyl group include compounds having a structure such as 3-tert-butyl-4-hydroxyphenyl or 3,5-di-tert-butyl-4-hydroxyphenyl. Among them, the compound having 3,5-di-tert-butyl-4-hydroxyphenyl structure is preferable.

Specific examples of the hindered phenol-based compound include a compound having one hydroxyphenyl structure, such as dibutylhydroxy toluene (BHT), 4,6-bis(octylthiomethyl)-o-cresol, 4,6-bis[(dodecylthio)methyl]-o-cresol, 2,4-dimethyl-6-(1-methylpentadecyl) phenol (e.g. Irganox 1141 available from BASF Japan Ltd.), and octadecyl-3-(3,5-di-t-butyl-4-hydroxyphenyl) propionate (e.g. ADK STAB AO-50 available from Adeka Corporation).

Other specific examples of the hindered phenol-based compound include a compound having two hydroxyphenyl structures, such as 2,2'-methylene bis(4-ethyl-6-tert-butylphenol) (e.g. YOSHINOX 425 available from Mitsubishi Chemical Corporation), 2,2'-methylene bis(4-methyl-6-tert-butylphenol) (e.g. Sandant 2246 available from Sanshin Chemical Industry Co., Ltd.), 4,4'-butylidene bis(3-methyl-6-tert-butylphenol) (e.g. YOSHINOX BB available from Mitsubishi Chemical Corporation), 4,4'-thiobis(3-methyl-6-tert-butylphenol) (e.g. NOCRAC 300 available from Ouchi Shinko Chemical Industrial Co., Ltd.), 4,4-methylene bis(2,6-di-tert-butylphenol), 2,6-di-tert-butyl-4-({2-[(3,5-di-tert-butyl-4-hydroxyphenyl) sulfanyl] propane-2-yl} sulfanyl) phenol (probucol), and 3,9-bis[2-[3-(3-tert-butyl-4-hydroxy-5-methylphenyl) propionyloxy]-1,1-dimethylethyl]-2,4,8,10-tetraoxaspiro[5.5] undecane (e.g. ADK STAB AO-80 available from Adeka Corporation).

Other specific examples of the hindered phenol-based compound include a compound having three hydroxyphenyl structures, such as 1,3,5-tris-(3,5-di-tert-butyl-4-hydroxybenzyl)-1,3-5-triazine-2,4,6(1H,3H,5H-)-trione (e.g. ADK STAB AO-20 available from Adeka Corporation), and 1,3,5-trimethyl-2,4,6-tris(3,5-di-t-butyl-4-hydroxybenzyl) benzene (e.g. ADK STAB AO330 available from Adeka Corporation).

Other specific examples of the hindered phenol-based compound include a compound having four hydroxyphenyl structures, such as pentaerythritol tetrakis[3-(3,5-di-tert-butyl-4-hydroxyphenyl) propionate] (e.g. ADK STAB AO-60 available from Adeka Corporation).

The hindered phenol-based compound may be used solely, or two or more of them may be used in combination.

As the hindered phenol-based compound, at least one compound selected from the group consisting of dibutylhydroxy toluene, octadecyl-3-(3,5-di-tert-butyl-4-hydroxyphenyl) propionate, 4,4'-methylene bis(2,6-di-tert-butylphenol), 2,6-di-tert-butyl-4-({2-[(3,5-di-tert-butyl-4-hydroxyphenyl) sulfanyl] propane-2-yl} sulfanyl) phenol, 1,3,5-tris(3,5-di-tert-butyl-4-hydroxybenzyl)-1,3,5-triazine-2,4,6-(1H,3H,5H)-trione, and pentaerythritol tetrakis[3-(3,5-di-tert-butyl-4-hydroxyphenyl) propionate is preferable.

As (d2) the hindered amine-based compound, a compound having 2,2,6,6-tetramethyl-4-piperidyl group as represented by the following chemical formula (1) is preferable.

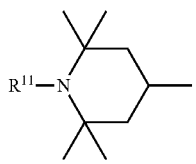
(1)

In the formula (1), $R^{11}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

The hindered amine-based compound represented by the chemical formula (1) includes the hindered amine-based compound as represented by the chemical formula (2) or chemical formula (3).

The hindered amine-based compound represented by the following chemical formula (2) is a so-called N-alkyl type hindered amine-based compound or NH type hindered amine-based compound.

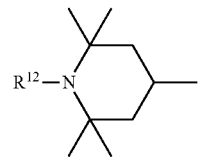
(2)

In the formula (2), $R^{12}$ is a hydrogen atom, a hydroxy group, an alkyl group having 1 to 30 carbon atoms, a hydroxyalkyl group having 1 to 30 carbon atoms, or an oxyradical.

The hindered amine-based compound represented by the following chemical formula (3) is a so-called N-alkoxy type hindered amine compound.

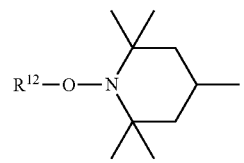
(3)

In the chemical formula (3), $R^{12}$ is an alkyl group having 1 to 30 carbon atoms or a hydroxyalkyl group having 1 to 30 carbon atoms.

Specific examples of (d2) the hindered amine-based compound include compounds represented by the chemical formulae (4) to (5).

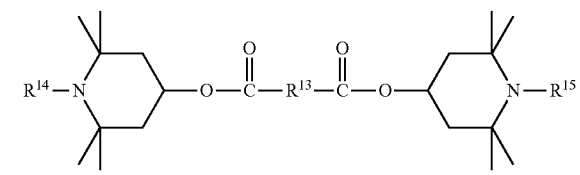
(4)

In the chemical formula (4), $R^{14}$ and $R^{15}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical. $R^{13}$ is an alkylene group having 1 to 30 carbon atoms.

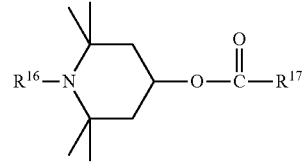
(5)

In the chemical formula (5), $R^{16}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical. $R^{17}$ is an alkyl group having 1 to 30 carbon atoms, or an alkenyl group having 2 to 30 carbon atoms.

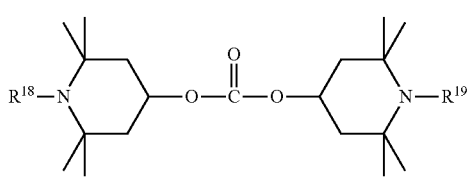

(6)

In the chemical formula (6), $R^{18}$ and $R^{19}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

Specific examples of (d2) the hindered amine compound include ADK STAB LA-52 (tetrakis(1,2,2,6,6-pentamethyl-4-piperidyl) butane-1,2,3,4-tetracarboxylate), ADK STAB LA-57 (tetrakis(2,2,6,6-tetramethyl-4-piperidyl) butane-1,2,3,4-tetracarboxylate), ADK STAB LA-63P, ADK STAB LA-68, ADK STAB LA-72 (bis(1,2,2,6,6-pentamethyl-4-piperidyl) sebacate, ADK STAB LA-77Y (bis(2,2,6,6-tetramethyl-4-piperidyl) sebacate, and ADK STAB LA-81 (bis(1-undecanoxy-2,2,6,6-tetramethylpiperidine-4-yl) carbonate available from Adeka Corporation.

Specific examples of (d2) the hindered amine compound include the following products available from BASF Japan Ltd.

1) Chimassorb 2020FDL
1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine 2) Chimassorb 944FDL
Poly[[6-[(1,1,3,3-tetramethylbutyl) amino]-1,3,5-triazine-2,4-diyl][(2,2,6,6-tetramethyl-4-piperidinyl) imino]-1,6-hexanediyl[(2,2,6,6-tetramethyl-4-piperidinyl) imino]])

3) TINUVIN 622SF
Butanedioic acid, dimethylester, polymer with 4-hydroxy-2,2,6,6-tetramethyl-1-piperidine ethanol)

4) TINUVIN PA144
Bis(1,2,2,6,6-pentamethyl-4-piperidinyl)-2-butyl-2-(4-hydroxy-3,5-di-tert-butylbenzyl) propanedioate (d2) The hindered amine-based compound may be used solely, or two or more of them may be used in combination. In addition, (d1) the hindered phenol compound and (d2) the hindered amine compound may be used in combination.

The amount of (d) the radical scavenger is preferably 2 parts by mass or more, more preferably 3 parts by mass or more, and even more preferably 5 parts by mass or more, and is preferably 15 parts by mass or less, more preferably 12 parts by mass or less, and even more preferably 10 parts by mass or less, with respect to 100 parts by mass of (a) the base rubber. If the amount of (d) the radical scavenger falls within the above range, the effective crosslinking density is decreased for the amount of the co-crosslinking agent, the breaking strain is increased, and the durability is enhanced.

[(e) Terpene-Based Resin]

The golf ball rubber composition according to the present invention also preferably contains a terpene-based resin. If the golf ball rubber composition contains the component (e), the crosslinking density is lowered while keeping the hardness of the cured product. The terpene-based resin is not particularly limited, as long as it is a polymer having a terpene compound as a constituent component. As the terpene-based resin, for example, at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer, is preferable.

The terpene polymer is a homopolymer obtained by polymerizing the terpene compound. The terpene compound is a hydrocarbon represented by $(C_5H_8)_n$ or an oxygen-containing derivate thereof, and is a compound having a terpene classified into monoterpene ($C_{10}H_{16}$), sesquiterpene ($C_{15}H_{24}$), diterpene ($C_{20}H_{32}$) or the like, as a basic skeleton. Examples of the terpene compound include α-pinene, β-pinene, dipentene, limonene, myrcene, alloocimene, ocimene, α-phellandrene, α-terpinene, γ-terpinene, terpinolene, 1,8-cineol, 1,4-cineol, α-terpineol, β-terpineol, and γ-terpineol. The terpene compound may be used solely, or at least two or more of them may be used in combination.

The terpene polymer is obtained, for example, by polymerizing the terpene compound. Examples of the terpene polymer include α-pinene polymer, β-pinene polymer, limonene polymer, dipentene polymer, and β-pinene/limonene polymer.

The terpene-phenol copolymer (sometimes referred to as "terpene phenolic resin") is, for example, a copolymer of the terpene compound and a phenol-based compound. Examples of the phenol-based compound include phenol, cresol, xylenol, catechol, resorcin, hydroquinone, and bisphenol A. As the terpene-phenol copolymer, a copolymer of the terpene compound and phenol is preferable.

The acid value of the terpene-phenol copolymer is preferably 10 mgKOH/g or more, more preferably 35 mgKOH/g or more, and even more preferably 60 mgKOH/g or more. In addition, the acid value of the terpene-phenol copolymer is preferably 300 mgKOH/g or less, more preferably 250 mgKOH/g or less, even more preferably 200 mgKOH/g or less, particularly preferably 150 mgKOH/g or less, and most preferably 90 mgKOH/g or less. It is noted that in the present invention, the acid value of the terpene-phenol copolymer is an amount of potassium hydroxide in milligrams required to neutralize the acid included in one gram of the terpene-phenol copolymer, and is a value measured by a potentiometric titration method (JIS K 0070: 1992).

The hydroxy value of the terpene-phenol copolymer is preferably 30 mgKOH/g or more, more preferably 50 mgKOH/g or more. The hydroxy value of the terpene-phenol copolymer is preferably 150 mgKOH/g or less, more preferably 100 mgKOH/g or less. It is noted that in the present specification, the hydroxy value is an amount of potassium hydroxide in milligrams required to neutralize acetic acid bonding to the hydroxy group when acetylating one gram of the resin, and is a value measured by a potentiometric titration method (JIS K 0070: 1992).

The terpene-styrene copolymer is, for example, a copolymer of the terpene compound and a styrene-based compound. Examples of the styrene-based compound include styrene, and α-methylstyrene. As the terpene-styrene copolymer, a copolymer of the terpene compound and α-methylstyrene is preferable.

The terpene-phenol-styrene copolymer is, for example, a copolymer of the terpene compound, the phenol-based compound and the styrene-based compound. As the terpene-phenol-styrene copolymer, a copolymer of the terpene compound, phenol and α-methylstyrene is preferable.

The hydrogenated terpene-phenol copolymer is obtained by hydrogenating the terpene-phenol copolymer. The hydrogenated terpene-styrene copolymer is obtained by hydrogenating the terpene-styrene copolymer. The hydrogenated terpene-phenol-styrene copolymer is obtained by hydrogenating the terpene-phenol-styrene copolymer.

As (e) the terpene-based resin, at least one member selected from the group consisting of compounds having a structure represented by the following chemical formulae (7) to (10), is preferable.

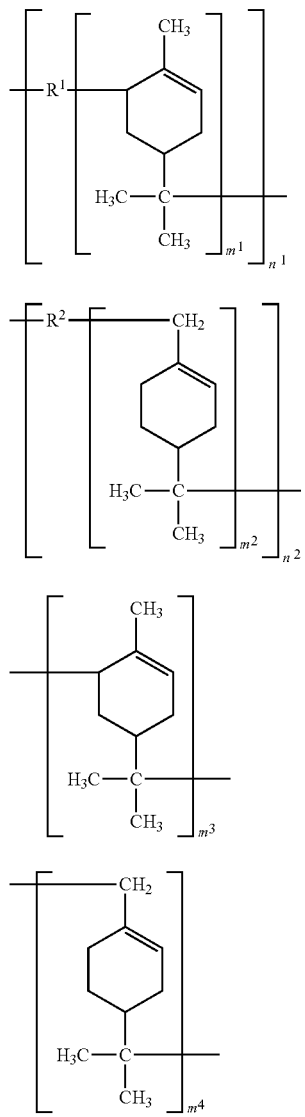

[In the chemical formulae (7) to (10), $R^1$ and $R^2$ each independently represent a divalent residue of the phenol-based compound and/or styrene-based compound, $m^1$ to $m^4$ each independently represent a natural number of 1 to 30, and $n^1$ to $n^2$ each independently represent a natural number of 1 to 20.]

Each of the compounds having the structure represented by the chemical formulae (7) to (10) has a structure derived from pinene in the molecule.

The compound having the structure represented by the chemical formula (7) has a repeating unit consisting of a structural moiety derived from α-pinene and $R^1$ bonding to the structural moiety derived from α-pinene. $R^1$ is preferably a divalent residue where two hydrogen atoms are removed from benzene ring of a phenol-based compound and/or styrene-based compound. Examples of the compound having the structure represented by the chemical formula (7) include a copolymer of α-pinene and a phenol-based compound and/or styrene-based compound.

Examples of the phenol-based compound include phenol, cresol, xylenol, catechol, resorcin, hydroquinone, and bisphenol A. Examples of the styrene-based compound include styrene, and α-methylstyrene.

In the chemical formula (7), $m^1$ represents a polymerization degree of the structural unit derived from α-pinene, and is preferably a natural number of 1 to 30. The above $m^1$ is preferably 1 or more, more preferably 2 or more, and even more preferably 3 or more, and is preferably 30 or less, more preferably 25 or less, and even more preferably 20 or less.

In the chemical formula (7), $n^1$ represents a polymerization degree of the repeating unit consisting of the structural moiety derived from α-pinene and $R^1$ bonding to the structural moiety derived from α-pinene, and is preferably a natural number of 1 to 20. The above $n^1$ is preferably 1 or more, more preferably 2 or more, and even more preferably 3 or more, and is preferably 20 or less, more preferably 18 or less, and even more preferably 15 or less.

The compound having the structure represented by the chemical formula (8) has a repeating unit consisting of a structural moiety derived from β-pinene and $R^2$ bonding to this structural moiety in the molecule. Examples of the compound having the structure represented by the chemical formula (8) include a copolymer of β-pinene and a phenol-based compound and/or styrene-based compound. $R^2$ is a divalent residue where two hydrogen atoms are removed from benzene ring of a phenol-based compound and/or styrene-based compound.

Examples of the phenol-based compound include phenol, cresol, xylenol, catechol, resorcin, hydroquinone, and bisphenol A. Examples of the styrene-based compound include styrene, and α-methylstyrene.

In the chemical formula (8), $m^2$ represents a polymerization degree of the structural unit derived from β-pinene, and is preferably a natural number of 1 to 30. The above $m^2$ is preferably 1 or more, more preferably 2 or more, and even more preferably 3 or more, and is preferably 30 or less, more preferably 25 or less, and even more preferably 20 or less.

In the chemical formula (8), $n^2$ represents a polymerization degree of the repeating unit consisting of the structural moiety derived from β-pinene and $R^2$ bonding to this structural moiety, and is preferably a natural number of 1 to 20. The above $n^2$ is preferably 1 or more, more preferably 2 or more, and even more preferably 3 or more, and is preferably 20 or less, more preferably 18 or less, and even more preferably 15 or less.

The compound having the structure represented by the chemical formula (9) is a polymer having a structural unit derived from α-pinene, more preferably a polymer consisting of the structural unit derived from α-pinene.

In the chemical formula (9), $m^3$ represents a polymerization degree of the structural unit derived from α-pinene, and is preferably a natural number of 1 to 30. The above $m^3$ is preferably 1 or more, more preferably 2 or more, and even more preferably 3 or more, and is preferably 30 or less, more preferably 25 or less, and even more preferably 20 or less.

The compound having the structure represented by the chemical formula (10) is a β-pinene polymer having a structural unit derived from β-pinene in the molecule, more preferably a polymer consisting of the structural unit derived from β-pinene.

In the chemical formula (10), $m^4$ represents a polymerization degree of the structural unit derived from β-pinene, and is preferably a natural number of 1 to 30. The above $m^4$ is preferably 1 or more, more preferably 2 or more, and even more preferably 3 or more, and is preferably 30 or less, more preferably 25 or less, and even more preferably 20 or less.

As (e) the terpene-based resin, α-pinene-phenol copolymer, α-pinene-α-methylstyrene copolymer, α-pinene-α-methylstyrene-phenol copolymer, β-pinene-phenol copolymer, β-pinene-α-methylstyrene copolymer, β-pinene-α-methylstyrene-phenol copolymer are particularly preferable. As (e) the terpene-based resin, these copolymers may be used solely, or two or more of them may be used in combination.

The softening point of (e) the terpene-based resin is preferably 60° C. or more, more preferably 80° C. or more, and even more preferably 100° C. or more, and is preferably 150° C. or less, more preferably 130° C. or less, and even more preferably 120° C. or less. If (d) the terpene-based resin having a softening point falling within the above range is used, the resin has better dispersibility in the rubber kneading. It is noted that the softening point of (e) the terpene-based resin is measured with a ring and ball type softening point measuring apparatus according to JIS K 6220-1: 2001, and is a temperature at which the ball drops.

As (e) the terpene-based resin, commercially available products can be used, and examples thereof include Sylvares TP2019 and Sylvatraxx 6720 available from Kraton Corporation; and YS RESIN PX1150N available from Yasuhara Chemical Co., Ltd.

The amount of (e) the terpene-based resin is preferably 2 parts by mass or more, more preferably 3 parts by mass or more, and even more preferably 4 parts by mass or more, and is preferably 20 parts by mass or less, more preferably 18 parts by mass or less, and even more preferably 15 parts by mass or less, with respect to 100 parts by mass of (a) the base rubber. If the amount of the component (e) is less than 2 parts by mass, the effect of adding the component (e) is small and the improvement effect on shot feeling on driver shots may not be obtained. On the other hand, if the amount of the component (e) is more than 20 parts by mass, the obtained core becomes so soft as a whole that the resilience may be lowered.

The blending ratio (the component (b)/the component (e)) of the component (b) to the component (e) is preferably 2.0 or more, more preferably 2.5 or more, and even more preferably 2.8 or more, and is preferably 15.0 or less, more preferably 12.0 or less, even more preferably 10.0 or less, and particularly preferably 8.0 or less, in a mass ratio. If the blending ratio (the component (b)/the component (e)) of the component (b) to the component (e) falls within the above range, the obtained golf ball has better shot feeling on driver shots.

[(f) Organic Sulfur Compound]

The golf ball rubber composition according to the present invention preferably further contains (f) an organic sulfur compound. If (f) the organic sulfur compound is contained, the obtained core has enhanced resilience.

As (f) the organic sulfur compound, at least one compound selected from the group consisting of thiols (thiophenols, thionaphthols), polysulfides, thiurams, thiocarboxylic acids, dithiocarboxylic acids, sulfenamides, dithiocarbamates, and thiazoles, is preferable.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol and pentaiodothiophenol; and metal salts thereof. As the metal salt, zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Among them, 2-thionaphthol, 1-thionaphthol, and metal salts thereof are preferable. As the metal salt, a divalent metal salt is preferable, zinc salt is more preferable. Specific examples of the metal salt include zinc salt of 1-thionaphthol and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide; thiuram disulfides such as tetramethylthiuram disulfide, tetraethylthiuram disulfide and tetrabutylthiuram disulfide; and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (f) the organic sulfur compound, the thiophenols and/or the metal salts thereof, the thionaphthols and/or the metal salts thereof, the diphenyl disulfides, and the thiuram disulfides are preferable. 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

(f) The organic sulfur compound may be used solely, or two or more of them may be used in combination.

The amount of (f) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (f) the organic sulfur compound is less than 0.05 part by mass, the effect of adding (f) the organic sulfur compound may not be obtained, and the resilience of the golf ball may not be enhanced. In addition, if the amount of (f) the organic sulfur compound is more than 5.0 parts by mass, the obtained golf ball has a great compression deformation amount and thus the resilience thereof may be lowered.

[(g) Metal compound]

The golf ball rubber composition according to the present invention preferably further contains (g) a metal compound. (g) The metal compound can be used as, for example, a weight adjusting agent for the rubber composition, or a neutralizing agent for the $\alpha,\beta$-unsaturated carboxylic acid having 3 to 8 carbon atoms.

Examples of (g) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (g) the metal compound, the divalent metal compound is preferable, the zinc compound is more preferable. This is because the divalent metal compound reacts with the $\alpha,\beta$-unsaturated carboxylic acid having 3 to 8 carbon atoms to form a metal crosslinking. In addition, if the zinc compound is used, the obtained golf ball has better resilience.

(g) The metal compound may be used solely, or at least two of them may be used in combination. In addition, the amount of (g) the metal compound may be appropriately adjusted according to the desired neutralization degree of (b) the $\alpha,\beta$-unsaturated carboxylic acid having 3 to 8 carbon atoms.

The golf ball rubber composition according to the present invention may further contain an additive such as a pigment, a filler for adjusting weight or the like, an antioxidant, a peptizing agent, and a softener, where necessary.

The filler blended in the rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder. As the filler, zinc oxide is particularly preferable. It is considered that zinc oxide acts as a vulcanizing aid to increase the hardness of the cured product (e.g. the core as a whole). The amount of the filler is preferably 0.5 part by mass or more, more preferably 1 part by mass or more, and is preferably 30 parts by mass or less, more preferably 25 parts by mass or less, and even more preferably 20 parts by mass or less with respect to 100 parts by mass of (a) the base rubber. If the amount of the filler is less than 0.5 part by mass, it is difficult to adjust the weight, and if the amount of the filler is more than 30 parts by mass, the weight proportion of the rubber component is decreased and thus the resilience tends to be lowered.

The amount of the peptizing agent is preferably 0.1 part by mass or more and 5 parts by mass or less with respect to 100 parts by mass of (a) the base rubber.

The golf ball rubber composition according to the present invention may be used for any portion of the constituent member of the golf ball. For example, the golf ball rubber composition according to the present invention is suitably used for a one-piece golf ball body, a core, or an intermediate layer. Among them, the golf ball rubber composition according to the present invention is suitably used for a single layered core, an inner core layer and/or an outer core layer of a dual layered core composed of the inner core layer and the outer core layer.

The present invention also provides a golf ball having a constituent member formed from the golf ball rubber composition according to the present invention. In a preferable embodiment of the golf ball according to the present invention, the golf ball comprises a core and at least one cover layer covering the core, wherein the core is formed from the golf ball rubber composition according to the present invention (hereinafter sometimes referred to as "core rubber composition"). Next, the golf ball according to the present invention will be explained.

In the case that the core is formed from the golf ball rubber composition according to the present invention, the cured product of the core surface preferably satisfies the mathematical formula (1), more preferably satisfies the mathematical formula (2). Specifically, the cured product in a region from the core surface to a thickness of 0.5 mm preferably satisfies the mathematical formula (1), more preferably satisfies the mathematical formula (2), even more preferably satisfies the mathematical formula (3).

[Core]

The core of the golf ball according to the present invention can be obtained by mixing and kneading the above core rubber composition, and molding the same in a mold. The molding conditions are not particularly limited, but the molding is generally carried out at a temperature ranging from 130° C. to 200° C. under a pressure of from 2.9 MPa to 11.8 MPa for 10 minutes to 60 minutes. For example, it is preferable that the molding is carried out by heating the core rubber composition at a temperature ranging from 130° C. to 200° C. for 10 minutes to 60 minutes, or alternatively, by molding the core rubber composition in a two-step heating, i.e. heated at a temperature ranging from 130° C. to 150° C. for 20 minutes to 40 minutes and then heated at a temperature ranging from 160° C. to 180° C. for 5 minutes to 15 minutes.

The surface hardness (Hs) of the core of the golf ball according to the present invention is preferably 50 or more, more preferably 55 or more, and even more preferably 60 or more, and is preferably 95 or less, more preferably 90 or less, and even more preferably 85 or less in Shore C hardness. If the surface hardness (Hs) of the core is 50 or more in Shore C hardness, the core has better resilience. In addition, if the surface hardness (Hs) of the core is 95 or less in Shore C hardness, the core has further enhanced shot feeling on driver shots.

The center hardness (Ho) of the core is preferably 30 or more, more preferably 35 or more, and even more preferably 40 or more in Shore C hardness. If the center hardness (Ho) of the core is 30 or more in Shore C hardness, the core does not become excessively soft and thus has better resilience. In addition, the center hardness (Ho) of the core is preferably 70 or less, more preferably 68 or less, and even more preferably 67 or less in Shore C hardness. If the center hardness (Ho) of the core is 70 or less in Shore C hardness, the core does not become excessively hard and thus has better shot feeling.

The hardness difference (Hs−Ho) between the surface hardness (Hs) and the center hardness (Ho) of the core is preferably 5 or more, more preferably 6 or more, and even more preferably 8 or more, and is preferably 35 or less, more preferably 30 or less, and even more preferably 28 or less in Shore C hardness. If the hardness difference (Hs−Ho) between the surface hardness (Hs) and the center hardness (Ho) of the core is 5 or more in Shore C hardness, the obtained golf ball has better resilience. In addition, if the hardness difference (Hs−Ho) between the surface hardness (Hs) and the center hardness (Ho) of the core is 35 or less in Shore C hardness, the obtained golf ball has further enhanced shot feeling on driver shots.

The diameter of the core of the golf ball according to the present invention is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the core is 34.8 mm or more, the cover does not become excessively thick and thus the resilience is better. On the other hand, if the diameter of the core is 42.2 mm or less, the cover does not become excessively thin and thus functions better.

When the core has a diameter in a range of from 34.8 mm to 42.2 mm, the compression deformation amount (shrinking amount along the compression direction) of the core when applying a load from 98 N as an initial load to 1275 N as a final load to the core is preferably 2.0 mm or more, more preferably 2.3 mm or more, and even more preferably 2.5 mm or more, and is preferably 5.0 mm or less, more preferably 4.5 mm or less, and even more preferably 4.3 mm or less. If the compression deformation amount is 2.0 mm or more, the shot feeling is better, and if the compression deformation amount is 5.0 mm or less, the resilience is better.

[Cover]

The cover of the golf ball according to the present invention is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Rabalon (registered trademark)" available from Mitsubishi Chemical Corporation.

Examples of the ionomer resin include a product obtained by neutralizing at least a part of carboxyl groups in a binary copolymer composed of an olefin and an α,β-unsaturated carboxylic acid having 3 to 8 carbon atoms with a metal ion; a product obtained by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture thereof. The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred. Among them, as the ionomer resin, a metal ion neutralized product of ethylene-(meth)acrylic acid binary copolymer or a metal ion neutralized product of ethylene-(meth)acrylic acid-(meth)acrylic acid ester ternary copolymer is preferred.

The cover composition for forming the cover of the golf ball according to the present invention preferably contains a thermoplastic polyurethane elastomer or an ionomer resin as the resin component. It is also preferred that when the ionomer resin is used, a thermoplastic styrene elastomer is used in combination. The amount of the polyurethane or ionomer resin in the resin component of the cover composition is preferably 50 mass % or more, more preferably 60 mass % or more, and even more preferably 70 mass % or more.

In addition to the resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as they do not impair the performance of the cover.

The amount of the white pigment (e.g. titanium oxide) is preferably 0.5 part or more, more preferably 1 part or more, and is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. In addition, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and even more preferably 60 or more in shore D hardness, and preferably has a slab hardness of 80 or less, more preferably 70 or less, and even more preferably 68 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more, and even more preferably 30 or more in shore D hardness. If the cover composition has a slab hardness of less than 50 in Shore D hardness, the obtained golf ball readily stops on the green due to the high spin rate on approach shots. In addition, if the cover composition has a slab hardness of 20 or more in Shore D hardness, the abrasion resistance is enhanced. In case of a plurality of cover layers, the slab hardness of the cover composition constituting each layer may be identical or different.

Examples of the method of molding the cover of the golf ball according to the present invention include a method which comprises molding the cover composition into a hollow shell, covering the core with a plurality of the hollow shells and performing compression molding (preferably a method which comprises molding the cover composition into a hollow half-shell, covering the core with two of the half-shells and performing compression molding); and a method which comprises injection molding the cover composition directly onto the core.

When molding the cover in a compression molding method, molding of the half shell can be performed by either the compression molding method or the injection molding method, and the compression molding method is preferred. Compression molding the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, the half shell having a uniform thickness can be formed. Examples of the method for molding the cover by using the half shell include a method which comprises covering the core with two of the half shells and then performing compression molding. Compression molding half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness can be formed.

In the case of injection molding the cover composition into the cover, the cover composition extruded in a pellet form may be used for injection molding, or the cover materials such as the base resin components and the pigment may be dry blended, followed by directly injection molding the blended material. It is preferred to use upper and lower molds having a hemi-spherical cavity and pimples for forming the cover, wherein a part of the pimples also serves as a retractable hold pin. When molding the cover by injection molding, the hold pin is protruded to hold the core, the cover composition is charged and then cooled to obtain the cover. For example, the cover composition heated at a temperature ranging from 200° C. to 250° C. is charged into a mold held under a pressure of 9 MPa to 15 MPa for 0.5 to 5 seconds, and after cooling for 10 to 60 seconds, the mold is opened to obtain the cover.

Concave portions called "dimples" are usually formed on the surface of the cover when the cover is molded. The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The thickness of the cover is preferably 4.0 mm or less, more preferably 3.0 mm or less, and even more preferably 2.0 mm or less. If the cover has a thickness of 4.0 mm or less, the resultant golf ball has better resilience or shot feeling. The thickness of the cover is preferably 0.3 mm or more, more preferably 0.5 mm or more, and even more preferably 0.8 mm or more. If the cover has a thickness of less than 0.3 mm, the durability or wear resistance of the cover may be lowered. In the case that the golf ball comprises a plurality of cover layers, the total thickness of a plurality of cover layers preferably falls within the above range.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

The construction of the golf ball according to the present invention is not particularly limited, as long as the golf ball comprises a core and at least one cover layer covering the core. The FIGURE is a partially cutaway cross-sectional view of a golf ball 1 according to one embodiment of the present invention. The golf ball 1 has a spherical core 2, and a cover 3 covering the spherical core 2. A plurality of dimples 31 are formed on the surface of the cover. Other portions than the dimples 31 on the surface of the golf ball 1 are lands 32. The golf ball 1 is provided with a paint layer and a mark layer on an outer side of the cover 3, but these layers are not depicted.

The core is preferably spherical. In addition, the construction of the core may be either a single layered construction or a multiple layered construction, and the single layered construction is preferable. Unlike the multiple layered core, the single layered core does not have an energy loss at the interface of the multiple layered core when being hit, and thus has better resilience. In addition, the cover has a construction composed of at least one layer, and may have either a single layered construction or a multiple layered construction composed of at least two layers. Examples of the golf ball according to the present invention include a two-piece golf ball composed of a core and a single layered cover disposed around the core, a multi-piece golf ball (including a three-piece golf ball) composed of a core and at least two cover layers disposed around the core, and a wound golf ball composed of a core, a rubber thread layer formed around the core and a cover disposed around the rubber thread layer. The present invention can be suitably applied to any one of the above golf balls.

The golf ball according to the present invention preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball according to the present invention preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball has a diameter in a range of from 40 mm to 45 mm, the compression deformation amount (shrinking amount along the compression direction) of the golf ball when applying a load from an initial load of 98 N to a final load of 1275 N to the golf ball is preferably 2.0 mm or more, more preferably 2.3 mm or more, and even more preferably 2.5 mm or more, and is preferably 4.0 mm or less, more preferably 3.5 mm or less, and even more preferably 3.3 mm or less. If the compression deformation amount is 2.0 mm or more, the golf ball does not become excessively hard, and thus has better shot feeling. On the other hand, if the compression deformation amount is 4.0 mm or less, the golf ball has better resilience.

Examples

Next, the present invention will be described in detail by way of examples. However, the present invention is not limited to the examples described below. Various changes and modifications without departing from the spirit of the present invention are included in the scope of the present invention.

[Evaluation Method]

(1) Effective Crosslinking Density (mmol/cc)

The effective crosslinking density of the cured product of the golf ball rubber composition is calculated based on a swelling measurement of a slab sample of the cured product of the golf ball rubber composition. The golf ball rubber composition was kneaded with a kneading roll and vulcanized at 170° C. for 30 minutes to produce a slab with a thickness of 0.5 mm, a length of 12 cm and a width of 14 cm. From this slab, a slab with a thickness of 0.5 mm and a size of 2 cm×2 cm was cut off for a test sample.

The swelling measurement was conducted by immersing the obtained slab sample in toluene at a temperature of 40° C. for 24 hours. The masses of the slab before and after the swelling were measured, and the effective crosslinking density was calculated using the following Flory-Rehner formula.

$$\upsilon(\text{mmol/cc}) = \frac{V_R + \ln(1 - V_R) + \mu V_R^2}{-V_0\left(V_R^{1/3} - \frac{V_R}{2}\right)} \times 10^3$$

$V_R$: proportion of volume of pure rubber to volume of swelled pure rubber in swelled vulcanized rubber
$\mu$: interaction constant of BR-solvent (toluene) (0.49)
$V_0$: molar volume of solvent (toluene) (108.15)
$\upsilon$: effective crosslinking density $$v_R = \frac{V_{BR}}{V_{BR} + V_T}$$

$$V_{BR} = \frac{W_F v_F}{\rho}$$

$$V_T = \frac{W_S - W_F}{\rho_T}$$

$V_{BR}$: volume of BR in rubber composition
$V_T$: volume of swelled toluene
$W_F$: weight of sample before swelling
$W_S$: weight of sample after swelling
$v_F$: weight proportion of rubber in rubber composition
$\rho$: density of rubber composition
$\rho_T$: density of toluene (0.8507)

(2) Compression Deformation Amount (mm)

The deformation amount along the compression direction of the core or golf ball (shrinking amount along the compression direction of the core or golf ball), when applying a load from an initial load of 98 N to a final load of 1275 N to the core or golf ball, was measured.

(3) Core Hardness (Shore C Hardness)

The Shore C hardness measured at the surface of the core by using an automatic hardness tester Digitest II available from Bareiss company was adopted as the surface hardness of the core. In addition, the core was cut into two hemispheres to obtain a cut plane, and the hardness at the central point of the cut plane was measured.

(4) Slab Hardness

Sheets with a thickness of about 2 mm were produced by injection molding the cover composition. The sheets were stored at a temperature of 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D". In the case of the rubber composition, the rubber composition was pressed at a temperature of 170° C. for 30 minutes to prepare sheets with a thickness of about 2 mm. The sheets were stored at a temperature of 23° C. for two weeks. At least three of these sheets were stacked on one another so as not to be affected by the measuring substrate on which the sheets were placed, and the hardness of the stack was measured with a type P1 automatic rubber hardness tester available from Kobunshi Keiki Co., Ltd., provided with a Shore C type spring hardness tester prescribed in ASTM-D2240.

(5) Durability

A W #1 driver provided with a metal head (XXIO S, loft angel: 11°, available from Sumitomo Rubber Industries, Ltd.) was installed on a swing robot M/C available from Golf Laboratories, Inc. The golf ball was hit repeatedly at a head speed of 45 m/sec until a crack occurred, and the hitting number when the crack occurred was counted. It is noted that the measurement was conducted using twelve samples for each golf ball, and the average value thereof was adopted as the hitting number for that golf ball. It is noted that the hitting number of the golf ball No. 1 was defined as 100, and the durability of each golf ball was represented by converting the hitting number of each golf ball into this index.

[Production of Golf Ball]

(1) Production of Core

The rubber compositions having the formulations shown in Tables 1, 2 were kneaded with a kneading roll, and heat-pressed in upper and lower molds, each having a hemispherical cavity, at a temperature of 170° C. for 30 minutes to produce spherical cores having a diameter of 39.7 mm.

TABLE 1

| | Golf ball No. | 1 | 2 | 3 | 4 | 5 | 6 | 7 | 8 | 9 | 10 | 11 |
|---|---|---|---|---|---|---|---|---|---|---|---|---|
| Rubber composition | (a) BR730 | 100 | 100 | 100 | 100 | 100 | 100 | 100 | 100 | 100 | 100 | 100 |
| | (b) ZDA | 31.9 | 29.2 | 34 | 39.3 | 40.6 | 44.8 | 40.6 | 35 | 39 | 44.3 | 46.3 |
| | (f) PBDS | 0.3 | — | 0.5 | 0.3 | 0.3 | 0.3 | 0.3 | 0.3 | 0.3 | 0.3 | 0.3 |
| | (f) DPDS | — | — | — | — | — | — | — | — | — | — | — |
| | (g) White Seal | 5 | 5 | 10 | 5 | 5 | 5 | 5 | 5 | 5 | 5 | 5 |
| | (c) DCP | 0.8 | 0.8 | 0.8 | 0.8 | 0.8 | 0.8 | 0.8 | 0.8 | 0.8 | 0.8 | 0.8 |
| | (g) Barium sulfate | 10.4 | 11.6 | 9 | 8.2 | 8.3 | 6.7 | 8.3 | 9.6 | 8.3 | 6.9 | 6.7 |
| | Benzoic acid | — | — | — | — | — | — | — | — | — | — | — |
| | (d) H-BHT | — | — | — | — | — | — | — | — | — | — | — |
| | (d) ADK STAB LA-77Y | — | — | — | — | — | — | — | — | — | — | — |
| | (e) TP2019 | — | — | — | — | — | — | — | 3 | 5 | 10 | 15 |
| | (e) YS POLYSTER T130 | — | — | — | 5 | 10 | — | — | — | — | — | — |
| | (e) YS POLYSTER U115 | — | — | — | — | — | 10 | — | — | — | — | — |
| | (e) YS POLYSTER K125 | — | — | — | — | — | — | 10 | — | — | — | — |
| Slab | Effective crosslinking density v (mmol/cc) | 2.36 | 2.25 | 2.01 | 0.90 | 0.67 | 0.69 | 0.46 | 0.75 | 0.63 | 0.44 | 0.34 |
| | Effective crosslinking density −0.1 × X (phr) | −0.51 | −0.38 | −1.05 | −2.64 | −2.98 | −3.34 | −3.19 | −2.40 | −2.88 | −3.54 | −3.83 |
| | Slab hardness (Shore C) | 83 | 80 | 78 | 75 | 68 | 72 | 64 | 73 | 72 | 69 | 66 |
| Core | Compression deformation amount of core (mm) | 3.2 | 3.1 | 3.1 | 3.0 | 3.2 | 3.0 | 3.4 | 3.2 | 3.0 | 3.1 | 3.4 |
| | Center hardness of core (Shore C) | 60 | 63 | 56 | 60 | 58 | 64 | 59 | 61 | 64 | 61 | 61 |
| | Surface hardness of core (Shore C) | 81 | 88 | 87 | 77 | 73 | 76 | 69 | 79 | 76 | 75 | 72 |
| Ball | Compression deformation amount of golf ball (mm) | 2.7 | 2.7 | 3.7 | 2.6 | 2.9 | 2.7 | 3.0 | 2.9 | 2.8 | 2.9 | 3.2 |
| | Durability of golf ball | 100 | 100 | 95 | 110 | 115 | 115 | 115 | 107 | 110 | 115 | 120 |

Formulation: parts by mass

TABLE 2

| | Golf ball No. | 12 | 13 | 14 | 15 | 16 | 17 |
|---|---|---|---|---|---|---|---|
| Rubber composition | (a) BR730 | 100 | 100 | 100 | 100 | 100 | 100 |
| | (b) ZDA | 29.2 | 22.5 | 32.1 | 35.1 | 29.2 | 35.1 |
| | (f) PBDS | — | — | — | — | — | — |
| | (f) DPDS | — | 0.5 | — | — | — | — |
| | (g) White Seal | 5 | 5 | 5 | 5 | 5 | 5 |
| | (c) DCP | 0.8 | 0.8 | 0.8 | 0.8 | 0.8 | 0.8 |
| | (g) Barium sulfate | 11.6 | — | 10.4 | 9.2 | 11.6 | 9.4 |
| | Benzoic acid | — | — | — | — | — | — |
| | (d) H-BHT | 1 | 1 | 3 | 5 | — | — |
| | (d) ADK STAB LA-77Y | — | — | — | — | 1 | 3 |
| | (e) TP2019 | — | — | — | — | — | — |
| | (e) YS POLYSTER T130 | — | — | — | — | — | — |
| | (e) YS POLYSTER U115 | — | — | — | — | — | — |
| | (e) YS POLYSTER K125 | — | — | — | — | — | — |
| Slab | Effective crosslinking density v (mmol/cc) | 1.71 | 0.65 | 1.37 | 1.16 | 2.19 | 2.06 |
| | Effective crosslinking density −0.1 × X (phr) | −0.92 | −1.38 | −1.52 | −2.00 | −0.44 | −1.10 |
| | Slab hardness (Shore C) | 76 | 64 | 76 | 75 | 75 | 76 |
| Core | Compression deformation amount of core (mm) | 3.4 | 3.4 | 3.5 | 3.3 | 3.3 | 3.2 |
| | Center hardness of core (Shore C) | 60 | 55 | 59 | 54 | 60 | 60 |
| | Surface hardness of core (Shore C) | 84 | 69 | 83 | 82 | 86 | 84 |
| Ball | Compression deformation amount of golf ball (mm) | 2.9 | 2.9 | 3.0 | 2.9 | 2.9 | 2.8 |
| | Durability of golf ball | 105 | 107 | 107 | 110 | 99 | 100 |

| | Golf ball No. | 18 | 19 | 20 | 21 | 22 | 23 |
|---|---|---|---|---|---|---|---|
| Rubber composition | (a) BR730 | 100 | 100 | 100 | 100 | 100 | 100 |
| | (b) ZDA | 44.8 | 43 | 44 | 40 | 45 | 42.5 |
| | (f) PBDS | — | 0.5 | — | 0.3 | 0.3 | — |
| | (f) DPDS | — | — | 0.5 | — | — | — |
| | (g) White Seal | 5 | 10 | 5 | 5 | 5 | 5 |
| | (c) DCP | 0.8 | 0.8 | 0.8 | 0.8 | 0.8 | 0.1 |
| | (g) Barium sulfate | 5.8 | 2.6 | 7.4 | 8 | 5.7 | 6.5 |
| | Benzoic acid | — | 2 | — | — | — | — |
| | (d) H-BHT | — | 5 | 5 | 2 | 4 | — |
| | (d) ADK STAB LA-77Y | 5 | — | — | — | — | — |
| | (e) TP2019 | — | — | — | 2 | 4 | — |
| | (e) YS POLYSTER T130 | — | — | — | — | — | — |
| | (e) YS POLYSTER U115 | — | — | — | — | — | — |
| | (e) YS POLYSTER K125 | — | — | — | — | — | — |

TABLE 2-continued

| | | | | | | | |
|---|---|---|---|---|---|---|---|
| Slab | Effective crosslinking density v (mmol/cc) | 2.31 | 1.28 | 0.79 | 0.82 | 0.58 | 0.72 |
| | Effective crosslinking density −0.1 × X (phr) | −1.72 | −2.59 | −3.17 | −2.78 | −3.47 | −3.11 |
| | Slab hardness (Shore C) | 80 | 79 | 72 | 74 | 70 | 74 |
| Core | Compression deformation amount of core (mm) | 3.0 | 3.4 | 3.1 | 3.3 | 3.3 | 3.0 |
| | Center hardness of core (Shore C) | 62 | 50 | 64 | 60 | 58 | 66 |
| | Surface hardness of core (Shore C) | 88 | 83 | 76 | 78 | 74 | 78 |
| Ball | Compression deformation amount of golf ball (mm) | 2.5 | 2.9 | 2.9 | 3.1 | 3.1 | 2.7 |
| | Durability of golf ball | 107 | 110 | 115 | 110 | 115 | 115 |

Formulation: parts by mass

The materials used in Tables 1, 2 are shown as follows.

BR730: high-cis polybutadiene rubber (cis-1,4 bond amount=95 mass %, 1,2-vinyl bond amount=1.3 mass %, Moony viscosity ($ML_{1+4}$ (100° C.))=55, molecular weight distribution (Mw/Mn)=3) available from JSR Corporation ZDA: zinc acrylate ZN-DA90S (surface treated in an amount of 10%) available from Nisshoku Techno Fine Chemical Co., Ltd.

DCP: dicumyl peroxide (one-minute half-life temperature: 175.2 centi-degree) available from Tokyo Chemical Industry Co., Ltd.

PBDS: bis(pentabromophenyl) disulfide available from Kawaguchi Chemical Industry Co., Ltd.

DPDS: diphenyl disulfide available from Sumitomo Seika Chemicals Co., Ltd.

White Seal: zinc oxide available from Indo Lysaght Corporation

Barium sulfate: "Barium sulfate BD" available from Sakai Chemical Industry Co., Ltd.

Benzoic acid: available from Tokyo Chemical Industry Co., Ltd.

H-BHT: dibutylhydroxy toluene available from Tokyo Zairyo Co., Ltd.

ADK STAB LA-77Y: hindered amine compound (bis(2,2,6,6-tetramethyl-4-piperidyl) sebacate available from Adeka Corporation Sylvares TP2019 (pinene-phenol copolymer, softening point: 125° C.) available from Kraton Corporation POLYSTER T130: terpene phenolic resin (softening point: 130±5° C.) available from Yasuhara Chemical Co., Ltd.

POLYSTER U115: terpene phenolic resin (softening point: 115±5° C.) available from Yasuhara Chemical Co., Ltd.

POLYSTER K125: terpene phenolic resin (softening point: 125±5° C.) available from Yasuhara Chemical Co., Ltd.

(2) Production of Cover and Production of Golf Ball

The cover material having the formulation shown in Table 3 was extruded with a twin-screw kneading type extruder to prepare the cover composition in a pellet form. The conditions for extruding the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above such that the formed cover had a thickness of 1.5 mm, to produce golf balls having the spherical core and the cover covering the core. Evaluation results of the obtained golf balls are shown in Tables 1, 2.

TABLE 3

| Cover composition No. | 1 |
|---|---|
| Himilan 1555 | 40 |
| Himilan 1605 | 20 |
| Himilan AM7329 | 40 |
| Titanium dioxide (A220) | 3 |
| JF-90 | 0.2 |
| Hardness (Shore D) | 63 |

Formulation: parts by mass

The materials used in Table 3 are shown as follows.

Himilan 1555: Na neutralized ionomer available from Du Pont-Mitsui Polychemicals Co., Ltd.

Himilan 1605: Na neutralized ionomer available from Du Pont-Mitsui Polychemicals Co., Ltd.

Himilan AM7329: Zn neutralized ionomer available from Du Pont-Mitsui Polychemicals Co., Ltd.

A-220: titanium dioxide available from Ishihara Sangyo Kaisha, Ltd.

JF-90: light stabilizer available from Johoku Chemical Co., Ltd.

As shown in Tables 1, 2, each of the golf balls according to the present invention has excellent durability.

The present invention is suitably applicable for a golf ball rubber composition. This application is based on Japanese Patent applications No. 2019-102378 filed on May 31, 2019 and No. 2020-086932 filed on May 18, 2020, the contents of which are hereby incorporated by reference.

The invention claimed is:

1. A cured product of a golf ball rubber composition containing consisting of:
    (a) a base rubber,
    (b) a divalent metal salt of an α,β-unsaturated carboxylic acid having 3 to 8 carbon atoms as a co-crosslinking agent, wherein the divalent metal salt is composed of two molecules of the α,β-unsaturated carboxylic acid having 3 to 8 carbon atoms and one divalent metal ion,
    (c) a crosslinking initiator,
    (d) a radical scavenger selected from the group consisting of a hindered phenol-based compound and a hindered amine-based compound, and/or (e) a terpene-based resin, and
    at least one component selected from the group consisting of an organic sulfur compound, a metal hydroxide, a metal oxide, a metal carbonate, a pigment, barium sulfate, tungsten powder, molybdenum powder, an antioxidant, a peptizing agent, and a softener,
    wherein the cured product of the golf ball rubber composition satisfies the following mathematical formula (1):

$$Y<(0.1 \times X)-2.00 \quad (1)$$

in the formula (1), Y represents an effective crosslinking density of the cured product of the rubber composition (mmol/cc), and X represents an amount (parts by mass) of the component (b) with respect to 100 parts by mass of (a) the base rubber.

2. The cured product of the golf ball rubber composition according to claim 1, wherein the golf ball rubber composition contains (d) the radical scavenger in an amount ranging from 2 parts by mass to 15 parts by mass with respect to 100 parts by mass of (a) the base rubber.

3. The cured product of the golf ball rubber composition according to claim 1, wherein the golf ball rubber composition contains (e) the terpene-based resin in an amount ranging from 2 parts by mass to 20 parts by mass with respect to 100 parts by mass of (a) the base rubber.

4. The cured product of the golf ball rubber composition according to claim 1, wherein (e) the terpene-based resin is at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

5. The cured product of the golf ball rubber composition according to claim 1, wherein (e) the terpene-based resin is at least one member selected from the group consisting of compounds having a structure represented by the following chemical formulae (7) to (10):

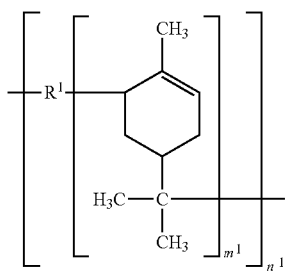

(7)

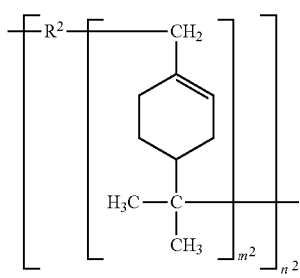

(8)

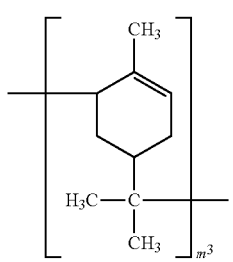

(9)

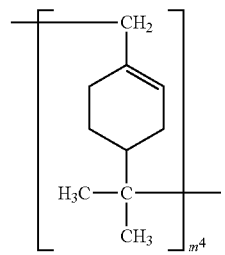

(10)

wherein in the chemical formulae (7) to (10),
R$^1$ and R$^2$ each independently represent a divalent residue of a phenol-based compound and/or a styrene-based compound,
m$^1$ to m$^4$ each independently represent a natural number of 1 to 30, and
n$^1$ to n$^2$ each independently represent a natural number of 1 to 20.

6. The cured product of the golf ball rubber composition according to claim 1, wherein (e) the terpene-based resin has a softening point in a range of from 60° C. to 150° C.

7. The cured product of the golf ball rubber composition according to claim 1, wherein the golf ball rubber composition contains (c) the crosslinking initiator in an amount ranging from 0.2 part by mass to 5.0 parts by mass with respect to 100 parts by mass of (a) the base rubber.

8. The cured product of the golf ball rubber composition according to claim 1, wherein the golf ball rubber composition further contains (f) an organic sulfur compound.

9. The cured product of the golf ball rubber composition according to claim 8, wherein (f) the organic sulfur compound is at least one member selected from the group consisting of thiophenols, thionaphthols, polysulfides, thiurams, thiocarboxylic acids, dithiocarboxylic acids, sulfenamides, dithiocarbamates, and thiazoles.

10. The cured product of the golf ball rubber composition according to claim 1, wherein the golf ball rubber composition contains (d) the radical scavenger in an amount of more than 5 parts by mass and 15 parts by mass or less with respect to 100 parts by mass of (a) the base rubber.

11. A golf ball comprising a cured product of a golf ball rubber composition as a constituent member, wherein the cured product is obtained by curing a golf ball rubber composition consisting of:
(a) a base rubber,
(b) a divalent metal salt of an α,β-unsaturated carboxylic acid having 3 to 8 carbon atoms as a co-crosslinking agent, wherein the divalent metal salt is composed of two molecules of the α,β-unsaturated carboxylic acid having 3 to 8 carbon atoms and one divalent metal ion,
(c) a crosslinking initiator,
(d) a radical scavenger selected from the group consisting of a hindered phenol-based compound and a hindered amine-based compound, and/or (e) a terpene-based resin, and
at least one component selected from the group consisting of an organic sulfur compound, a metal hydroxide, a metal oxide, a metal carbonate, a pigment, barium sulfate, tungsten powder, molybdenum powder, an antioxidant, a peptizing agent, and a softener,
wherein the cured product satisfies the following mathematical formula (1):

$$Y<(0.1\times X)-2.00 \qquad (1)$$

wherein in the formula (1), Y represents an effective crosslinking density of the cured product of the rubber composition (mmol/cc), and X represents an amount (parts by mass) of the component (b) with respect to 100 parts by mass of (a) the base rubber.

12. The golf ball according to claim 11, wherein the golf ball rubber composition contains (d) the radical scavenger in an amount ranging from 2 parts by mass to 15 parts by mass with respect to 100 parts by mass of (a) the base rubber.

13. The golf ball according to claim 11, wherein the golf ball rubber composition contains (e) the terpene-based resin in an amount ranging from 2 parts by mass to 20 parts by mass with respect to 100 parts by mass of (a) the base rubber.

14. The golf ball according to claim 11, wherein (e) the terpene-based resin is at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

15. The golf ball according to claim 11, wherein (e) the terpene-based resin is at least one member selected from the group consisting of compounds having a structure represented by the following chemical formulae (7) to (10):

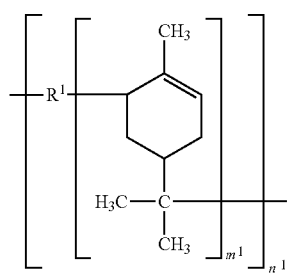

(7)

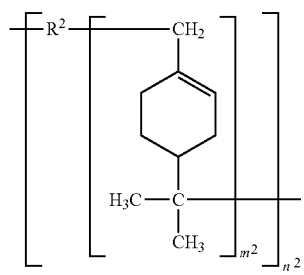

(8)

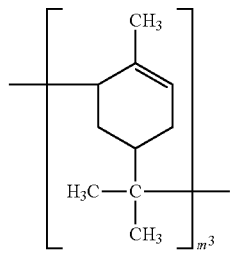

(9)

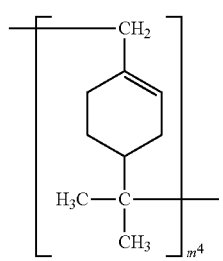

(10)

wherein in the chemical formulae (7) to (10),
R$^1$ and R$^2$ each independently represent a divalent residue of a phenol-based compound and/or a styrene-based compound,
m$^1$ to m$^4$ each independently represent a natural number of 1 to 30, and
n$^1$ to n$^2$ each independently represent a natural number of 1 to 20.

16. The golf ball according to claim 11, wherein (e) the terpene-based resin has a softening point in a range of from 60° C. to 150° C.

17. The golf ball according to claim 11, wherein the golf ball rubber composition contains (c) the crosslinking initiator in an amount ranging from 0.2 part by mass to 5.0 parts by mass with respect to 100 parts by mass of (a) the base rubber.

18. The golf ball according to claim 11, wherein the golf ball rubber composition further contains (f) an organic sulfur compound.

19. The golf ball according to claim 18, wherein (f) the organic sulfur compound is at least one member selected from the group consisting of thiophenols, thionaphthols, polysulfides, thiurams, thiocarboxylic acids, dithiocarboxylic acids, sulfenamides, dithiocarbamates, and thiazoles.

20. The golf ball according to claim 11, wherein the golf ball rubber composition contains (d) the radical scavenger in an amount of more than 5 parts by mass and 15 parts by mass or less with respect to 100 parts by mass of (a) the base rubber.

* * * * *